Figure 1:
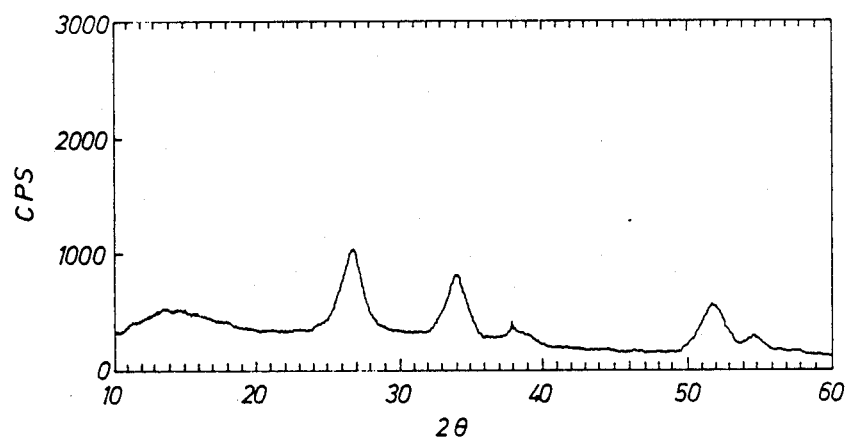

United States Patent [19]

Nishikura et al.

[11] Patent Number: 4,775,412
[45] Date of Patent: Oct. 4, 1988

[54] AQUEOUS SOL OF CRYSTALLINE TIN OXIDE SOLID SOLUTION CONTAINING ANTIMONY, AND PRODUCTION THEREOF

[75] Inventors: Hiroshi Nishikura; Shin Yamamoto, both of Kakogawa; Yukio Terao, Kobe, all of Japan

[73] Assignee: Taki Chemical Co., Ltd., Kakogawa, Japan

[21] Appl. No.: 23,504

[22] Filed: Mar. 9, 1987

[30] Foreign Application Priority Data

Mar. 19, 1986 [JP] Japan .................................. 61-63657

[51] Int. Cl.$^4$ .......................... C22B 5/00; H01B 1/06
[52] U.S. Cl. ............................... 75/0.5 A; 75/101 BE; 75/103; 75/108; 75/109; 252/518; 252/501.1; 423/592; 423/593; 423/617; 423/618
[58] Field of Search ............................ 252/518, 501.1; 350/357, 363; 75/0.5 A, 101 BE, 103, 108, 109, 121; 423/592, 593, 617, 618, DIG. 14, 89, 98

[56] References Cited

U.S. PATENT DOCUMENTS

| | | | |
|---|---|---|---|
| 4,113,507 | 9/1978 | McHenry et al. | 252/518 |
| 4,303,554 | 12/1981 | Sudo et al. | 252/500 |
| 4,420,500 | 12/1983 | Nakatami et al. | 252/518 |
| 4,545,928 | 10/1985 | Kano et al. | 252/500 |
| 4,559,165 | 12/1985 | Kohlmuller et al. | 252/518 |
| 4,566,992 | 1/1986 | Joseph et al. | 252/518 |
| 4,678,505 | 7/1987 | Bushey | 75/0.5 A |

Primary Examiner—Josephine Barr
Attorney, Agent, or Firm—Armstrong, Nikaido, Marmelstein & Kubovcik

[57] ABSTRACT

An aqueous sol of a crystalline tin oxide solid solution containing antimony and having a particle size not larger than 300Å is prepared by adding an alkali metal bicarbonate or ammonium bicarbonate to an acidic aqueous solution containing a compound of tin and a compound of antimony to form a gel; purifying the gel; adding aqueous ammonia to the purified gel to form a slurry; and heating the slurry until a sol is formed.

7 Claims, 2 Drawing Sheets

AQUEOUS SOL OF CRYSTALLINE TIN OXIDE SOLID SOLUTION CONTAINING ANTIMONY, AND PRODUCTION THEREOF

The present invention relates to a sol of crystalline tin oxide solid solution containing antimony and to a method of producing the same.

Tin oxide solid solution containing antimony type compounds are excellent in electric conductivity, light transmission, physical and chemical durability, etc. and accompanied with the recent striking development of electrooptical elements, they have a growing demand as industrial materials in the field of transparent conductive materials.

Such transparent conductive materials are provided for practical use usually after being covered on a substrate in the form of film, by film forming methods such as CVD method, vacuum deposition method, reactive ion plating method, sputtering method, etc. However, all these methods have defects in that the apparatus used is complicated and the film formation speed is slow. In addition, the film formation is limited to a small area, this making it impossible to obtain films of a large area. Furthermore, application of these methods to a substrate of complicated form is difficult.

On the contrary, the so-called dip coating method in which film is formed by dipping a substrate into a liquid material, is a promising method for industrial practice since it has advantages in that it makes it possible to obtain a large area film by a relatively simple process and it is applicable to a substrate of a complicated form.

In the tin oxide solid solution containing antimony type materials, this dip coating method is widely studied, and the thermal decomposition behavior of various liquid tin and antimony compounds has been studied. However, the tin and antimony compounds which have been studied heretofore are mainly salt solutions of inorganic or organic compounds containing tin and antimony together as ions, and therefore after these materials are coated on a substrate, a firing process has been necessary to convert them into tin oxide solid solution containing antimony. Accordingly, the tin oxide solid solution containing antimony generated in this process is generally coarse in particle diameter and non-uniform, this making it impossible to obtain uniform films. Thus, there has been a problem in their application to the field in which uniformity and fineness are particularly required.

In addition, when using such compounds as stannic chloride or antimony trichloride, etc., poisonous and corrosive gases are generated upon firing. Therefore, it has been necessary to select anti-corrosive furnaces. In addition, there have been many problems as to working environment.

In the light of these circumstances, we, the inventors made an intensive study to obtain a sol of crystalline tin oxide solid solution containing antimony which is excellent in various characteristics desired upon application to transparent conductive materials and further to other ceramic material fields. As a result, we accomplished the present invention.

Thus, the present invention relates to a sol of crystalline tin oxide solid solution containing antimony and to a method of producing the same. The first object of the present invention is to provide a sol of crystalline tin oxide solid solution containing antimony having a particle diameter not larger than 300 Å which forms a solid solution of tin oxide and antimony in a molar ratio Sb/Sn being 0.3 or less. Another object of the present invention is to provide a method of producing a sol of crystalline tin oxide solid solution containing antimony advantageously by reacting a tin compound and an antimony compound with an alkali-metal bicarbonate or ammonium bicarbonate to form a gel, thereafter adding aqueous ammonia to the gel and subjecting the gel to hydrothermal treatment.

The crystalline tin oxide solid solution containing antimony as referred in the present invention means a solid solution of tin oxide and antimony which is identified as the crystal form of Cassiterite by X-ray diffraction analysis.

First, an explanation will be given in the following on the sol of crystalline tin oxide solid solution containing antimony of the present invention which has a particle diameter of not larger than 300 Å, and is a solid solution of tin oxide and antimony in the molar ratio Sb/Sn being 0.3 or less.

A method of producing a sol composed of tin and antimony known heretofore is to hydrolyze tin alcoxide and antimony alcoxide by various means.

However, the sol obtained by this method is noncrystalline or else it is a kind of hydroxide of tin and/or antimony.

In contrast thereto, the sol of crystalline tin oxide solid solution containing antimony of the present invention has the crystal form of tin oxide, provides extremely fine colloidal particles of not larger than 300 Å in the form of an aqueous solution and forms a stable sol solution.

Figure 2:
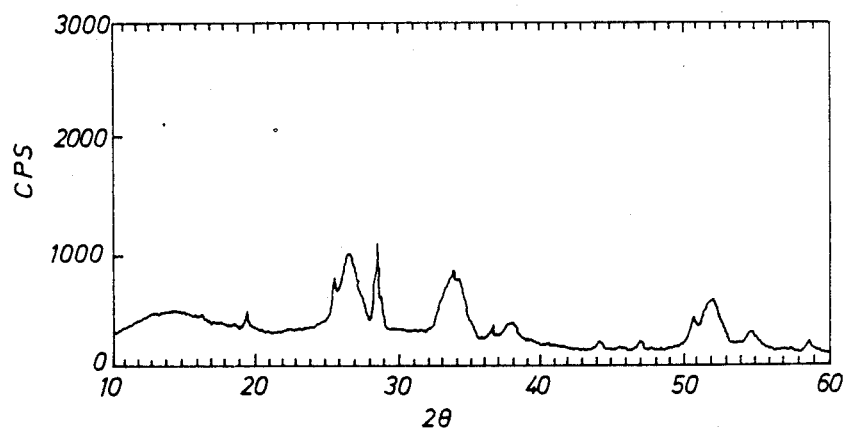
Figure 3:
Figure 4:
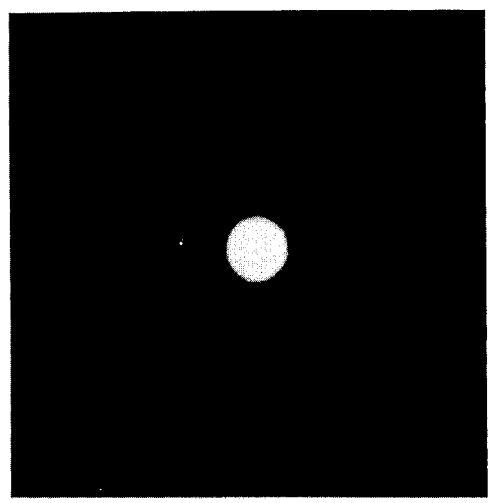

The present invention will be explained in more detail in the following by referring partly to the accompanying drawings, wherein FIG. 1 is an X-ray diffraction pattern of the product dried at 100° C. of the sol of crystalline tin oxide solid solution containing antimony of the present invention obtained in Embodiment Example 1; FIG. 2 is an X-ray diffraction pattern of the final product dried at 100° C. obtained in Comparative Example 1; FIG. 3 is an enlarged photograph by a transmission type electron microscope of the sol of crystalline tin oxide solid solution containing antimony of the present invention obtained in Embodiment Example 3; and FIG. 4 is an electron diffraction pattern of the sol of crystalline tin oxide solid solution containing antimony of the present invention obtained in Embodiment Example 3.

In the following, the sol of crystalline tin oxide solid solution containing antimony of the present invention will be explained in further detail by way of Embodiment Examples.

EMBODIMENT EXAMPLE 1

A thousand (1000) parts of an aqueous stannic chloride solution (16.5% as $SnO_2$), 45 parts of antimony trichloride and 180 parts of hydrochloric acid (36.0% as HCl) were mixed and dissolved to prepare a uniform aqueous solution. This aqueous solution was gradually added to 6423 parts of an aqueous ammonium bicarbonate solution (2.5 % as $NH_3$) under stirring. The pH of gel solution at this time was 7.3. After filtering off the generated gel, it was washed with water until no chlorine was observed in the gel. Thus a gel containing 29.0% $SnO_2$, 4.2% Sb and 0.33% $NH_3$ was obtained.

Then, 82 parts of aqueous ammonia (1.0% as $NH_3$) and 398 parts of water were added to 100 parts of the gel to prepare a gel slurry of pH 10.4. Thereafter, the slurry was transferred to an autoclave in which it was subjected to hydrothermal treatment at 200° C. for 6 hours, and thereby the sol of crystalline tin oxide solid solution containing antimony of the present invention (product of this invention) was obtained.

Composition analysis of this sol and X-ray diffraction analysis of a 100° C. dried product of the sol were made. Also, the particle diameter of the sol was measured by enlarged observation through a transmission type electron microscope. The X-ray diffraction analysis apparatus used was the Geigerflex (RAD-IIIa type) produced by Rikagaku Denki K.K. and the transmission type electron microscope used was that of JEM-200CX type produced by JEOL Ltd.

Representative results are shown in Table 1 and the X-ray diffraction pattern is shown in FIG. 1.

COMPARATIVE EXAMPLE 1

1000 parts of an aqueous stannic chloride solution (16.5% as $SnO_2$) was gradually added to 4170 parts of an aqueous ammonium bicarbonate solution (2.5% as $NH_3$) under stirring. After filtering off the generated gel, it was washed with water until no chlorine was observed in the gel. Thus a gel containing 35.7% $SnO_2$ and 0.4% $NH_3$ was obtained.

Then, 101 parts of aqueous ammonia (1.0% as $NH_3$) and 448 parts of water were added to 100 parts of the gel and mixed to prepare a gel slurry of pH 10.4. Thereafter, the slurry was subjected to hydrothermal treatment at 200° C. for 6 hours.

A solution of 45 parts of antimony trichloride in 180 parts of hydrochloride acid (36.0% as HCl) was gradually addedto 2253 parts of an aqueous ammonium bicarbonate solution (2.5% as $NH_3$) under stirring. After filterring off the generated precipitate, it was washed with water until no chlorine was observed in the precipitate. Thus a precipitate containing 43.4% Sb and 0.02% $NH_3$ was obtained. Then, 0.6 part of aqueous ammonia (1.0% as $NH_3$) and 89 parts of water were added to 20 parts of the precipitate and mixed to prepare a suspension of pH 10.4. The suspension was transferred to an autoclave in which it was subjected to hydrothermal treatment at 200° C. for 6 hours. One hundred (100) parts of the before-mentioned hydrothermal treatment product containing tin only and 10 parts of the hydrothermal treatment product containing antimony only were mixed to obtain a Comparison product. Composition analysis of this Comparison product and X-ray diffraction analysis of the product dried at 100° C. were made. The particle diameter was measured by enlarged observation through a transmission type electron microscope. The respective results are shown in Table 1 and the X-ray diffraction pattern is shown in FIG. 2.

TABLE 1

|  | Composition analysis | | | Particle diameter (Å) | State of the sol | X-ray diffraction analysis |
|---|---|---|---|---|---|---|
|  | $SnO_2$ (%) | Sb (%) | Sb/Sn molar ratio | | | |
| Embodiment Example 1 (this invention) | 5.0 | 0.72 | 0.18 | 80 | Stable sol solution | Cassiterite peaks only (FIG. 1) |
| Comparative Example 1 | 5.0 | 0.72 | 0.18 | Measurement impossible | Precipitant observed | Peaks of Cassiterite and $Sb_2O_3$ (FIG. 2) |

As apparent from Embodiment Example 1, although the sol of the present invention contains both tin and antimony as shown by the chemical analysis, the X-ray diffraction analysis shows only the diffraction peaks of Cassiterite and no peak of antimony compound. (refer to FIG. 1-this invention)

As opposed thereto, the product obtained in Comparative Example 1 shows diffraction peaks of $Sb_2O_3$ (Valentinite type) in addition to the diffraction peaks of Cassiterite. This shows that the Comparison product is a mere mixture of tin oxide and antimony oxide. (refer to FIG. 2—Comparative Example 1)

From this fact, it is apparent that the sol of the present invention is not a mere mixture of tin oxide and antimony oxide, but is a sol of particles of a solid solution consisting of tin oxide and antimony. It is generally known that antimony oxide easily forms a solid solution with tin oxide of Cassiterite structure. This aids in proving the fact of the present invention.

To make this fact clearer a further explanation will be made by way of Embodiment Examples 2-5 and Comparative Examples 2-4.

EMBODIMENT EXAMPLES 2-5

In the same manner as in Embodiment Example 1, sols of crystalline tin oxide solid solution containing antimony of the present invention having different Sb/Sn molar ratios were produced.

The quantities of antimony trichloride and hydrochloric acid (36.0% as HCl) shown in Table 2 were added to 1000 parts of an aqueous stannic chloride solution (16.5% as $SnO_2$), and the mixture was blended together and dissolved to prepare uniform aqueous solutions. These solutions were gradually added under stirring to the quantities of aqueous ammonium bicarbonate solutions (2.5% as $NH_3$) shown in Table 2, respectively. After filtering off the generated gels, they were washed with water until no chlorine was observed in the gels. In this way, gels of the compositions shown in Table 2 were obtained.

To 100 parts of each gel, the quantities of aqueous ammonia (1.0% as $NH_3$) and water shown in Table 2 were added and mixed to prepare gel slurries of pH 10.4. These were transferred to an autoclave and were subjected to hydrothermal treatment at 200° C. for 6 hours, and the sols of crystalline tin oxide solid solution containing antimony of the present invention (products of this invention) were obtained.

TABLE 2

| | Quantities (parts) used for 100 parts of the aqueous chloride solution | | | Composition of the generated gel (weight %) | | | Quantities (parts) used for 100 parts of the generated gel | |
|---|---|---|---|---|---|---|---|---|
| | Hydrochloric acid | Antimony trichloride | Aqueous ammonium bicarbonate solution | SnO$_2$ | Sb | NH$_3$ | Aqueous ammonia | Water |
| (This invention) | | | | | | | | |
| Embodiment Example 2 | 20 | 5.0 | 4420 | 34.5 | 0.6 | 0.39 | 97.6 | 664.9 |
| Embodiment Example 3 | 110 | 27.5 | 5547 | 32.0 | 2.8 | 0.36 | 90.5 | 609.5 |
| Embodiment Example 4 | 170 | 42.5 | 6298 | 30.3 | 4.3 | 0.34 | 85.7 | 571.8 |
| Embodiment Example 5 | 240 | 60.0 | 7174 | 29.0 | 5.7 | 0.33 | 82.0 | 543.0 |

COMPARATIVE EXAMPLES 2-4

In the same way as in Comparative Example 1, compositions of different Sb/Sn molar ratios were produced. That is to say, the hydrothermal treatment product containing only tin, the hydrothermal treatment product containing only antimony both obtained in Comparative Example 1, and water were mixed respectively in the ratios shown in Table 3. Thus Comparative Example products were obtained.

TABLE 3

| | Hydrothermal treatment product containing only tin (parts) | Hydrothermal treatment product containing only antimony (parts) | Water (parts) |
|---|---|---|---|
| Comparative Example 2 | 100 | 0 | 37.5 |
| Comparative Example 3 | 100 | 1.1 | 36.4 |
| Comparative Example 4 | 100 | 13.3 | 24.2 |

Composition analysis and the following measurement were made for the compositions obtained in Embodiment Examples 2-5 and Comparative Examples 2-4.

(1) Crystal form

The crystal form was identified from the X-ray diffraction pattern of the powder of 100° C.-dried product.

(2) d-Value

The position of the (200) peak of SnO$_2$ (Cassiterite) in the X-ray diffraction pattern was measured precisely, and the d-value corresponding to the (200) peak was calculated therefrom.

(3) Size of the crystallites

The half width at the (211) peak of SnO$_2$ (Cassiterite) in the X-ray diffraction pattern was measured, and the size of the crystallites was obtained from the Scherrer's formula:

$$D = \frac{0.9\,\lambda}{\beta \cos \theta}$$

wherein D=size of the crystallites (Å),
λ=X-ray wave length (Å),
β=half width at the peak (rad),,
θ=diffraction angle, (4) Conductivity of the powder The 100° C.-dried powder was press-shaped into pellets and the electric resistance of the pellets under the pressure of 450 kg/cm$^2$ was measured. The conductivity was calculated therefrom.

The results are shown in Table 4.

The enlarged photograph of the products of the present invention obtained in Embodiment Example 3 by a transmission type electron microscope and its electron diffraction pattern are shown in FIG. 3 and FIG. 4, respectively.

TABLE 4

| | Composition analysis | | | (1) Crystal form | (2) d-Value (Å) | (3) Size of crystallites (Å) | (4) Conductivity of the powder (S/cm) |
|---|---|---|---|---|---|---|---|
| | SnO$_2$ (%) | Sb (%) | Sb/Sn molar ratio | | | | |
| (this invention) | | | | | | | |
| Embodiment Example 2 | 4.00 | 0.065 | 0.02 | Cassiterite only | 2.368 | 45.3 | $4.8 \times 10^{-5}$ |
| Embodiment Example 3 | 4.00 | 0.355 | 0.11 | Cassiterite only | 2.366 | 43.8 | $4.5 \times 10^{-4}$ |
| Embodiment Example 4 | 4.00 | 0.549 | 0.17 | Cassiterite only | 2.365 | 42.7 | $4.8 \times 10^{-4}$ |
| Embodiment Example 5 | 4.00 | 0.776 | 0.24 | Cassiterite only | 2.353 | 39.3 | $4.3 \times 10^{-4}$ |
| Comparative Example 2 | 4.00 | 0 | 0 | Cassiterite only | 2.369 | 46.7 | $9.8 \times 10^{-7}$ |
| Comparative Example 3 | 4.00 | 0.065 | 0.02 | Cassiterite and Sb$_2$O$_3$ | 2.369 | 46.7 | $9.1 \times 10^{-7}$ |
| Comparative Example 4 | 4.00 | 0.776 | 0.24 | Cassiterite and Sb$_2$O$_3$ | 2.369 | 46.7 | $8.3 \times 10^{-7}$ |

The points which have become apparent from the results in Table 4 are enumerated as follows:

(1) Although the products of the present invention contain both tin and antimony, the products show only the X-ray diffraction peaks of Cassiterite. On the other hand, in the Comparative Example products (Comparative Examples 3 and 4), the diffraction peaks of $Sb_2O_3$ (Valentinite) are present independently in addition to the diffraction peaks of Cassiterite. This fact is just the same as the comparison result between Embodiment Example 1 and Comparative Example 1.

(2) In the products of the present invention, the d-value lowers with the increase of the content of antimony, in other words, with the increase of the Sb/Sn molar ratio. This fact shows that since antimony, of which the ion radius is smaller, has formed a solid solution with tin oxide (Cassiterite), the crystal structure has changed to the direction in which the lattice constant becomes small. On the other hand, such a phenomenon is not seen in Comparative Example products.

(3) In the products of the present invention, the size of the crystallites decreases with the increase of the Sb/Sn molar ratio.

As will be mentioned later, the size of the particles of the sol of the present invention changes depending upon the particular condition of hydrothermal treatment. However, the fact that, even if the condition of hydrothermal treatment is maintained constant, the size of the crystallites is different depending on the quantity of antimony, as in the present Example, is the result of restrained crystallization of $SnO_2$ (Cassiterite) by the existence of antimony. This shows that antimony reacts with $SnO_2$ which is in the course of crystallization. In the Comparative Example products, such a phenomenon is not observed because $SnO_2$ and $Sb_2O_3$ exist independently, respectively.

(4) The conductivity of the powder of the products of the present invention is higher by 2 to 3 orders in comparison with that of Comparative Example products. It is generally accepted that the mechanism of electric conduction of $SnO_2$ is due to free electrons generated by oxygen deficiency. But when antimony and $SnO_2$ having different valency numbers form a solid solution as in the present invention products, the number of free electrons increases greatly, and thus the conductivity becomes higher.

From these facts (1)-(4) also, it is understood that the sol of the present invention is not a mere mixture of tin oxide and antimony oxide but is a sol of particles of a solid solution of tin oxide and antimony.

What is apparent about the enlarged photograph of the product of the present invention by a transmission type electron microscope and its electron diffraction pattern is that the product of the present invention is formed of fine crystalline particles of SnO (Cassiterite).

The sol of the present invention explained hereinabove by way of Embodiment Examples 1-5 and Comparative Examples 1-4 is one which has not been known heretofore and this will develop new uses in the application field of tin oxide solid solution containing antimony type materials.

The characteristics of the sol of crystalline tin oxide solid solution containing antimony of the present invention are enumerated again as follows:

First, as mentioned above, the colloidal particles of the sol of the present invention are uniform and are composed of fine crystals of tin oxide. In order to utilize the conventional sol which is amorphous or is composed of crystals of tin hydroxide and/or antimony hydroxide as a tin oxide solid solution containing antimony type material, it is necessary to fire it at a temperature above 500° C. At this time, the colloidal particles are liable to agglomerate irreversibly so that it is impossible to obtain fine tin oxide solid solution containing antimony particles.

In contrast thereto, the sol of crystalline tin oxide solid solution containing antimony of the present invention can be formed into superfine particulate powder of tin oxide solid solution containing antimony by merely drying it. This is very beneficial in the production of tin oxide solid solution containing antimony type ceramics.

The measurement of the particle diameter of the sol was made by observation through an electron microscope. In the sol of the present invention, substantially all particles have a diameter not larger than 300 Å.

Secondly, the sol of the present invention does not generate any corrosive gas upon drying or firing.

The sol of the present invention contains only a small quantity of ammonia as a stabilizer, and this ammonia easily evaporates away upon drying.

In contrast thereto, the salt solutions containing tin and antimony as ions contain a considerable quantity of acid radicals, and in order to evaporate them completely, a fairly high temperature treatment is necessary. For example, in stannic chloride and anti-mony trichloride type solutions, a poisonous and corrosive hydrochloride gas is generated upon firing and therefore such solutions are not favorable for the selection of furnaces and working environment. For such reasons, the sol of the present invention is useful from the industrial viewpoint.

Thirdly, the sol of the present invention has excellent stability.

The conventional sol produced by the alkoxide method has a fatal defect in that it becomes unstable with the passage of time. The sol of the present invention has good stability in addition to its high purity, and it should be called a higher quality product.

The sol of crystalline tin oxide solid solution containing antimony of the present invention having the above-mentioned excellent characteristics is not only very useful as a transparent conductive material but also it is useful for the application to the electroceramics field for example, as gas sensor materials, and it is a new substance applicable to many other uses.

As a conductive material, it is applicable to solar cells, EL elements, liquid crystal elements, transparent electric terminals such as transparent switches, surface charge prevention of displays such as CRT, prevention of electromagnetic wave hindrance, conductance acceleration of discharge tubes, prevention of window fogging of cars, airplaines, apparatus, etc., transparent heating elements, thin film resistors, ground coating treatment for non-electrolytic plating, charge prevention of glass fibers, etc. Furthermore, it is also applicable as conductive powder produced by coating inorganic fillers such as calcium carbonate, silica, etc. However, its application is not limited to these.

In the next place, explanation will be given about the method of producing the sol of crystalline tin oxide solid solution containing antimony of the present invention.

The sol of the present invention can be produced by reacting a tin compound and an antimony compound with an alkali metal bicarbonate or ammonium bicarbonate to form a gel, adding aqueous ammonia to the gel, and then subjecting the gel to hydrothermal treatment.

In the present invention, firstly a tin compound and an antimony compound are reacted with an alkali metal bicarbonate or ammonium bicarbonate to obtain a gel. As the tin compounds used in the present invention may be mentioned, for example, stannic chloride, stannic sulfate, etc., and as the antimony compounds may be mentioned antimony trichloride, etc. As the alkali metal bicarbonate may be mentioned sodium bicarbonate, potassium bicarbonate, etc. However, the present invention is not limited to these compounds. Furthermore, it should be noted that when a gel produced from materials other than the above-mentioned materials is used for the present invention, it is impossible to attain the object of the invention.

That is to say, gels produced using sodium carbonate, sodium hydroxide, ammonia, etc. instead of the abovementioned bicarbonates, are inferior in filtrability and moreover are susceptible to aging. Even if such a gel is subjected to the later-mentioned treatment, it is impossible to produce a sol of crystalline tin oxide solid solution containing antimony having excellent dispersibility as that of the present invention.

As for the ratio of these materials to be used, first, the ratio of the alkali metal bicarbonate or ammonium bicarbonate to be used for a tin compound and antimony compound is such a ratio that the alkali metal bicarbonate or ammonium bicarbonate is added so as to bring the pH of the reaction solution at the end of the gel forming reaction to more than 6.0. When the quantity of the alkali metal bicarbonate or ammonium bicarbonate is smaller than this, tin and antimony do not form a gel completely, thus worthening the yield. Such a smaller quantity is also undesirable from economical reasons, etc.

The ratio of the tin compound and antimony compound to be used is regulated so that the Sb/Sn molar ratio will become 0.3 or less. When the Sb/Sn molar ratio exceeds 0.3, even if the gel is subjected to the later-mentioned treatment of the present invention, it becomes difficult to obtain the sol of the present invention, and the sol formed contains a crystalline compound composed singly of antimony.

There is no particular limitation on the lower limit of the Sb/Sn molar ratio. However, when the sol of tin oxide solid solution containing antimony of the present invention is applied to a transparent conductive material for example, if the Sb/Sn molar ratio is lower than 0.005, its conductivity decreases remarkably, so that such a ratio is unfavorable for practical use.

There is no limitation on the order of addition of the three, that is tin compound, antimony compound, alkali metal bicarbonate or ammonium bicarbonate. However, addition of a mixed aqueous solution of tin compound and antimony compound to an aqueous solution of alkali metal bicarbonate or ammonium bicarbonate is preferable because this method makes it possible to obtain a uniform gel and to carry out the gel washing operation more efficiently.

At this time, there are cases where the mixed aqueous solution may become unstable to form a water-insoluble precipitate, depending on the kind of tin compound or antimony compound, ratio of mixing, concentration, etc. In such a case, it is effective to dissolve the precipitate by adding a small quantity of a mineral acid such as hydrochloric acid, etc. Such a mineral acid as hydrochloric acid may be added to the aqueous solution of tin compound or antimony compound beforehand.

The temperature upon the gel forming reaction may be room temperature, and there is no necessity of a special operation as heating or cooling.

The gel thus produced is then washed to remove impurities. At this time, the impurities may be removed by contacting the gel with a suitable ion exchange resin.

The gel after washing is then adjusted for the pH by adding aqueous ammonia. A suitable quantity of aqueous ammonia to be added is such as to bring the pH of the gel to within the range of from 8 to 12, desirably to within the range of from 9 to 11. When the pH goes out of the abovementioned range, it is impossible to obtain a sol having excellent dispersibility. At this time, the quantity of aqueous ammonia to be added is generally within the range of from 0.05 to 1.00 mol for one mol of $SnO_2$, although it may vary with the quantity and kinds of a trace amount of residual impurities in the gel or the concentration of $SnO_2$ and Sb therein.

Then the pH-adjusted gel is regulated for the concentration by adding water, if necessary. At this time, it is desirable to bring the concentration of $SnO_2$ to below 15%. At the concentration higher than this, the sol generated is very viscous and its handling becomes very difficult.

The gel adjusted for its pH and concentration is then subjected to hydrothermal treatment. By this treatment, a sol of crystalline tin oxide solid solution containing antimony having a particle diameter not larger than 300 Å is formed. As to the hydrothermal treatment condition, the higher treating temperature and the longer treating time provides the better development of crystal form and the bigger colloidal particles of crystal.

For example, in order to produce a sol composed of colloidal particles having a particle diameter of about 80 Å, a hydrothermal treatment at 200° C. for 6 hours is necessary. According as a particular use of the sol of crystalline tin oxide solid solution containing antimony, one having the most suitable particle diameter should be produced. It is one of the great characteristics of this invention that the control of the particle diameter is possible by suitably selecting the hydrothermal treatment condition.

In the following, the present invention will be explained by way of Examples, but the invention is not limited to these. In the Examples, percentages are by weight unless otherwise indicated.

EXAMPLE 1

5.4 parts of antimony trichloride was added to 1000 parts of an aqueous stannic chloride solution (17.6% as $SnO_2$) and the mixture was heated and dissolved at 80° C. After cooling, the resulting solution was gradually added with stirring to 3494 parts of an aqueous ammonium bicarbonate solution (3.0% as $NH_3$) to form a gel. The pH of the gel at this time was 7.2. The thus-formed gel was separated by filtration. To this separated gel, about 1000 parts of water was added and repulp-mixed. The mixture was subjected to solid-liquid separation by a centrifuge. These operations were repeated until no chlorine was observed in the gel. As the result, a gel containing 32.1% $SnO_2$, 0.52% Sb and 0.54% $NH_3$ was obtained. Then 9 parts of aqueous ammonia (2.0% as $NH_3$) and 212 parts of water were added to this gel and mixed with it to produce a gel slurry of pH 9.6. The slurry was transferred to an autoclave, in which it was subjected to hydrothermal treatment at 230° C. for 4 hours to obtain the sol of the present invention.

The result of composition analysis of this sol was 10.0% $SnO_2$, 0.16% Sb and a Sb/Sn molar ratio of 0.02. The particle diameter was measured by observation through a transmission type electron microscope. The result was 120 Å. X-ray diffraction analysis of the sol dried at 100° C. was made. The d-value of the main peaks were 3.35 Å, 2.62 Å, 1.77 Å, 2.37 Å and 1.68 Å. Therefore the crystal form was identified as Cassiterite. No X-ray diffraction peaks resulting from antimony compound were observed. This sol was caused to stand at room temperature for one month, but no sediment was observed, with the sol state being maintained.

EXAMPLE 2

To 9008 parts of an aqueous sodium bicarbonate solution (1.4% as Na), 1000 parts of an aqueous stannic sulfate solution (10.5% as $SnO_2$) and 424 parts of an aqueous hydrochloric acid-acidified antimony trichloride solution (6.9% as Sb, 18.4% as Cl) were added gradually at the same time with stirring to produce a gel. The pH of the gel solution at this time was 7.6. After separating the produced gel by filtration, it was washed with water until no sodium, chlorine and sulfate radicals were observed in the gel. As the result, a gel containing 23.7% $SnO_2$ and 5.7% Sb was obtained. Then 98 parts of aqueous ammonia (1.5% as $NH_3$) and 141 parts of water were added to 100 parts of this gel and mixed with it to produce a gel slurry of pH 10.9. The slurry was then transferred to an autoclave, in which it was subjected to hydrothermal treatment at 100° C. for 10 hours to obtain the sol of the present invention. The result of composition analysis of this sol was 7.0% $SnO_2$, 1.7% Sb and a Sb/Sn molar ratio of 0.3. The particle diameter was measured by observation through a transmission type electron microscope. The result was 60 Å. X-ray diffraction analysis of this sol dried at 100° C. was made, with the result that the crystal form was identified as Cassiterite, and no X-ray diffraction peaks resulting from antimony compound were observed. This sol was caused to stand at room temperature for one month but no sediment was observed, with the sol state being maintained.

What we claim is:

1. An aqueous sol of crystalline tin oxide solid solution containing antimony in the form of fine particles having a particle diameter of not larger than 300 Å the molar ratio Sb/Sn being 0.005–0.3.

2. A method of producing an aqueous sol of a crystalline tin oxide solid solution containing antimony and having a particle size not larger than 300Å, which comprsies:

adding an alkali metal bicarbonate or ammonium bicarbonate to an acidic aqeous solution containing a compound of tin and a compound of antimony dissolved therein, wherein the ration of Sb/Sn is in the range of 0.005 to 0.3, to form a gel;

removing impurities from the gel;

adding aqueous ammonia to the purified gel to form a gel slurry; and heating the gel slurry until said sol is formed.

3. A method according to claim 2 wherein the pH of the solution at the end of the gel formation reaction is not lower than 6.0.

4. A method according to claim 2 wherein the aqueous ammonia is added to the gel so as to bring the pH to 8–12.

5. A method according to claim 2, wherein the gel slurry is heated in a closed system at a temperature of 100°–230° C. for 2–10 hours.

6. A method according to claim 2, wherein impurities are removed by washing the gel with water.

7. A method accirding to claim 2, wherein impurities are removed by contacting the gel with an ionic exchange resin.

* * * * *